United States Patent
Dorfman

(10) Patent No.: US 9,431,147 B2
(45) Date of Patent: Aug. 30, 2016

(54) THERMOFORMABLE POLYMER THICK FILM TRANSPARENT CONDUCTOR AND ITS USE IN CAPACITIVE SWITCH CIRCUITS

(71) Applicant: E I DU PONT DE NEMOURS AND COMPANY, Wilmington, DE (US)

(72) Inventor: Jay Robert Dorfman, Durham, NC (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 189 days.

(21) Appl. No.: 14/489,878

(22) Filed: Sep. 18, 2014

(65) Prior Publication Data

US 2016/0086686 A1   Mar. 24, 2016

(51) Int. Cl.
| | |
|---|---|
| *H01B 1/20* | (2006.01) |
| *C09D 5/24* | (2006.01) |
| *C09D 171/00* | (2006.01) |
| *C09D 175/04* | (2006.01) |
| *C08L 71/00* | (2006.01) |
| *C08L 75/04* | (2006.01) |
| *H01B 1/22* | (2006.01) |
| *C08K 3/22* | (2006.01) |

(52) U.S. Cl.
CPC .............. *H01B 1/20* (2013.01); *C08K 3/2279* (2013.01); *C08L 71/00* (2013.01); *C08L 75/04* (2013.01); *C09D 5/24* (2013.01); *C09D 171/00* (2013.01); *C09D 175/04* (2013.01); *H01B 1/22* (2013.01); *C08G 2650/56* (2013.01); *C08J 2375/04* (2013.01); *C08K 2003/2231* (2013.01)

(58) Field of Classification Search
CPC ....................................................... H01B 1/20
USPC ............................................................ 428/323
See application file for complete search history.

(56) References Cited

U.S. PATENT DOCUMENTS

| 5,112,687 A | 5/1992 | Frentzel et al. | |
|---|---|---|---|
| 2005/0214526 A1* | 9/2005 | Klein | ............... B32B 27/36 428/328 |
| 2013/0069016 A1* | 3/2013 | Dorfman | ............... H01B 1/22 252/514 |
| 2014/0154501 A1 | 6/2014 | Dorfman | |
| 2014/0305923 A1* | 10/2014 | Dorfman | ............... H05B 3/145 219/202 |

FOREIGN PATENT DOCUMENTS

| EP | 1582967 A1 | 10/2005 |
|---|---|---|
| WO | 96/06438 A1 | 2/1996 |

OTHER PUBLICATIONS

International Search Report Dated Jan. 5, 2016 for International Patent Application No. PCT/US2015-047846.

* cited by examiner

*Primary Examiner* — Doris Lee

(57) ABSTRACT

This invention is directed to a polymer thick film transparent conductor composition that may be used in applications where thermoforming of the base substrate occurs, e.g., as in capacitive switches. Polycarbonate substrates are often used as the substrate and the polymer thick film conductive composition may be used without any barrier layer. Depending on the specific design, the thermoformable transparent conductor may be below or on top of a thermoformable silver conductor. Thermoformable electric circuits benefit from the presence of an encapsulant layer over the dried polymer thick film transparent conductor composition. The electrical circuit may be subsequently subjected to an injection molding process.

27 Claims, No Drawings

THERMOFORMABLE POLYMER THICK FILM TRANSPARENT CONDUCTOR AND ITS USE IN CAPACITIVE SWITCH CIRCUITS

FIELD OF THE INVENTION

This invention is directed to polymer thick film transparent conductive compositions that may be used in applications where thermoforming of the base substrate occurs. Polycarbonate substrates are often used and the conductor may be used without any barrier layer.

BACKGROUND OF THE INVENTION

Conductive PTF circuits have long been used as electrical elements. Although they have been used for years in these types of applications, the use of PTF silver conductors in thermoforming procedures is not common. This is particularly important in circuits where a highly conductive silver composition is needed after the severe thermoforming process. Additionally, the typical substrate used for thermoforming is polycarbonate and very often the conductor is not compatible with this substrate. One of the purposes of this invention is to alleviate these issues and produce a conductive, thermoformable construction in which a printed transparent conductor can be used either on a substrate of choice such as a polycarbonate or as part of the capacitive circuit stack where it can be printed below or above silver.

SUMMARY OF THE INVENTION

This invention relates to a polymer thick film transparent conductor composition comprising:
(a) 10-70 wt % of a conductive oxide powder selected from the group consisting of indium tin oxide powder, antimony tin oxide powder and mixtures thereof; and
(b) 30-90 wt % of an organic medium comprising 1-50 wt % thermoplastic urethane resin and 10-50 wt % thermoplastic polyhydroxyether resin, wherein the thermoplastic urethane resin and the thermoplastic polyhydroxyether resin are both dissolved in triethyl phosphate and wherein the weight percent of the thermoplastic urethane resin and the thermoplastic
(c) polyhydroxyether resin are based on the total weight of the organic medium;
wherein the weight percent of the conductive oxide powder and the organic medium are based on the total weight of the polymer thick film transparent conductor composition.

In one embodiment, the conductive oxide powder particles are in the form of flakes.

The invention is further directed to using the thermoformable polymer thick film transparent conductor composition to form conductive electrical circuits for capacitive switches and, in particular, in the thermoforming of the total construction. In one embodiment an encapsulant layer is deposited over the dried PTF transparent conductor composition.

DETAILED DESCRIPTION OF INVENTION

The invention relates to a polymer thick film transparent conductor composition for use in thermoforming electrical circuits and, in particular, capacitive switch circuits. A layer of conductor is printed and dried on a substrate so as to produce a functioning circuit and then the entire circuit is subjected to pressure and heat that deforms the circuit to its desired three dimensional characteristics, i.e., thermoforming.

The substrates commonly used in polymer thick film thermoformed circuits are polycarbonate (PC), polyvinyl chloride (PVC) and others. PC is generally preferred since it can be thermoformed at higher temperatures. However, PC is very sensitive to the solvents used in the layers deposited on it.

The polymer thick film (PTF) transparent conductor composition is comprised of (i) a conductive oxide powder selected from the group consisting of indium tin oxide (ITO) powder, antimony tin oxide (ATO) powder and mixtures thereof, and (ii) an organic medium comprising thermoplastic urethane resin and thermoplastic polyhydroxyether resin both dissolved in triethyl phosphate.

Additionally, powders and printing aids may be added to improve the composition.

The use of the term transparent is a relative one. Herein, transparent is meant to mean at least 30% light transmission through the printed/dried conductor.

Each constituent of the PTF transparent conductor composition of the present invention is discussed in detail below.

A. Transparent Conductive Powder

The conductors in the present thick film composition are ITO powder, ATO powder, or mixtures thereof. Various particle diameters and shapes of the powder particles are contemplated. In an embodiment, the conductive powder particles may include any shape, including spherical particles, flakes (rods, cones, plates), and mixtures thereof. In one embodiment, the ITO is in the form of flakes.

In an embodiment, the particle size distribution of the ITO and ATO powders is 0.3 to 50 microns; in a further embodiment, 0.5-15 microns.

In an embodiment, the surface area/weight ratio of the conductive oxide powder particles is in the range of 1.0-100 $m^2/g$.

ITO is tin-doped indium oxide, $Sn:In_2O_3$, i.e., a solid solution of $In_2O_3$ and $SnO_2$ with typically 90 wt % $In_2O_3$ and 10 wt % $SnO_2$. ATO is antimony-doped tin oxide, $Sb:SnO_2$, i.e., a solid solution of $Sb_2O_3$ and $SnO_2$ with typically 10 wt % $Sb_2O_3$ and 90 wt % $SnO_2$.

Furthermore, it is known that small amounts of other metals may be added to PTF transparent conductor compositions to improve the electrical properties of the conductor. Some examples of such metals include: gold, silver, copper, nickel, aluminum, platinum, palladium, molybdenum, tungsten, tantalum, tin, indium, lanthanum, gadolinium, boron, ruthenium, cobalt, titanium, yttrium, europium, gallium, sulfur, zinc, silicon, magnesium, barium, cerium, strontium, lead, antimony, conductive carbon, and combinations thereof and others common in the art of thick film compositions. The additional metal(s) may comprise up to about 1.0 percent by weight of the total composition. However, the degree of transparency may suffer as these metals are added.

In one embodiment, the conductive oxide powder is present at 10 to 70 wt %, based on the total weight of the PTF transparent conductor composition. In another embodiment, it is present at 20 to 60 wt % and in still another embodiment, it is present at 25 to 55 wt %, again based on the total weight of the PTF transparent conductor composition.

B. Organic Media

The organic medium is comprised of a thermoplastic urethane resin and a thermoplastic polyhydroxyether resin both dissolved in triethyl phosphate.

The urethane resin must achieve good adhesion to the underlying substrate. It must be compatible with and not adversely affect the performance of the circuit after thermoforming. In one embodiment the thermoplastic urethane resin is 1-50 wt % of the total weight of the organic medium. In another embodiment the thermoplastic urethane resin is 1-25 wt % of the total weight of the organic medium and in still another embodiment the thermoplastic urethane resin is 3-15 wt % of the total weight of the organic medium. In one embodiment the thermoplastic urethane resin is a urethane homopolymer. In another embodiment the thermoplastic urethane resin is a polyester-based copolymer.

In one embodiment the thermoplastic polyhydroxyether resin is 10-50 wt % of the total weight of the organic medium. In another embodiment the thermoplastic polyhydroxyether resin is 10-25 wt % of the total weight of the organic medium and in still another embodiment the thermoplastic polyhydroxyether resin is 10-20 wt % of the total weight of the organic medium.

The polymer resins are typically added to the triethyl phosphate solvent by mechanical mixing to form the medium. It is to be noted here that use of triethyl phosphate as the organic solvent provides beneficial properties to the composition.

Additional Powders

Various powders may be added to the PTF conductor composition to improve adhesion, modify the rheology and increase the low shear viscosity thereby improving the printability.

Application of the PTF Conductor Composition

The PTF transparent conductor composition, also referred to as a "paste", is typically deposited on a substrate, such as polycarbonate, that is impermeable to gases and moisture. The substrate can also be a sheet of a composite material made up of a combination of plastic sheet with optional metallic or dielectric layers deposited thereupon. The transparent conductor may also be deposited on top of a thermoformable Ag conductor formed from using, e.g., DuPont™ 5042 or 5043 (DuPont Co., Wilmington, Del.), or on a thermoformable dielectric layer. Alternatively, a thermoformable Ag conductor may be formed on top of the transparent conductor.

The deposition of the PTF transparent conductor composition is performed typically by screen printing, but other deposition techniques such as stencil printing, syringe dispensing or coating techniques can be utilized. In the case of screen-printing, the screen mesh size controls the thickness of the deposited thick film.

Generally, a thick film composition comprises a functional phase that imparts appropriate electrically functional properties to the composition. The functional phase comprises electrically functional powders dispersed in an organic medium that acts as a carrier for the functional phase. Generally, the composition is fired to burn out both the polymer and the solvent of the organic medium and to impart the electrically functional properties. However, in the case of a polymer thick film, the polymer portion of the organic medium remains as an integral part of the composition after drying and, therefore, is an integral part of the resultant conductor.

The PTF transparent conductor composition is processed for a time and at a temperature necessary to remove all solvent. For example, the deposited thick film is dried by exposure to heat at 130° C. for typically 10-15 min.

Circuit Construction

The base substrate used is typically 10 mil thick polycarbonate. The PTF transparent conductor composition is printed and dried as per the conditions described above. Several layers can be printed and dried. Subsequent steps may include thermoforming (190° C., 750 psi) of the entire unit as is typical in the production of 3D capacitive switch circuits. In one embodiment an encapsulant layer is deposited over the dried PTF conductive composition, i.e., the transparent conductor, and then dried.

In one embodiment, the encapsulant is comprised of the same resins as contained in the PTF transparent conductor composition, i.e., the same resins in the same ratios as present in the PTF conductive composition. In another such embodiment, the encapsulant is comprised of the same resins as contained in the PTF transparent conductor composition, i.e., the same resins but in different ratios than present in the PTF transparent conductor composition.

In another embodiment, an encapsulant layer is deposited over the dried PTF transparent conductor composition and then UV-cured. In this embodiment the encapsulant is comprised of one or more UV-curable polymers, e.g., acrylate-based polymers. One PTF UV-curable composition suitable for forming an encapsulant layer is comprised of a high elongation urethane oligomer, an acrylate monomer, an acrylated amine and an inorganic powder.

It has been found that use of an encapsulant improves the yield (i.e. decreases the failure rate) of thermoformed circuits.

In the course of producing a 3-dimensional capacitive circuit, after the thermoforming step, the final step will often be a molding step in which the finished circuit is formed by injection molding using a resin such as polycarbonate. This process is referred to as in-molding and involves higher temperatures. Depending on the resin chosen, these temperatures can typically exceed 250° C. for 10-30 sec. Thus the choice of the resins used in the PTF composition is critical. The combination of the resins used in the instant PTF composition has been shown to survive the in-mold process and produce fully functional circuitry whereas most resins typically used in PTF compositions will not.

EXAMPLE, COMPARATIVE EXPERIMENT

Example 1

The PTF transparent conductor composition was prepared in the following manner. 69 wt % of the organic medium was used and was prepared by mixing 5.0 wt % Desmocoll 406 polyurethane (Bayer MaterialScience LLC, Pittsburgh, Pa.) and 15.0 wt % PKHH polyhydroxyether resin (Phenoxy Associates, Rock Hill, S.C.) with 80.0 wt % triethyl phosphate (Eastman Chemical, Kingsport, Tenn.) organic solvent. The molecular weight of the resins was approximately 20,000. This mixture was heated at 90° C. for 1-2 hours to dissolve the resins. 31 wt % of Zelec 3010-XC ATO powder (Milliken Chemical, Spartanburg, S.C.) with an average particle size of approximately 0.5 microns was added to the organic medium. The wt % of the organic medium and the ATO powder, were based upon the total weight of the PTF transparent conductor composition.

This composition was mixed for 30 minutes on a planetary mixer, and then subjected to several passes on the three roll mill.

A circuit was then fabricated as follows. On a 10 mil thick polycarbonate substrate, a pattern of a series of interdigitated lines was printed using a 325 mesh stainless steel screen. The patterned lines were dried at 130° C. for 10 min in a forced air box oven. The part was inspected and minimal deformation of the underlying substrate was found. After thermoforming at 190° C., the conductive lines remained conductive and were well adhered to the substrate. Resistivity values of 1900 ohms/sq/mil were obtained at a dried thickness of approximately 5 microns.

Comparative Experiment A

A PTF transparent conductor composition was prepared in the following manner. A composition was prepared exactly like that in Example 1 with the exception that DiBasic Esters-9 (DuPont Co., Wilmington, Del.) was used as the solvent in place of triethyl phosphate.

Resistivity values of 9200 ohms/sq/mil were obtained at a dried thickness of approximately 6 microns.

The advantages of using triethyl phosphate as solvent are significant. Since polycarbonate is the substrate of choice for most thermoformed and Injection molded circuits, anything that reduces resistivity is critical. The resistivity value of the transparent conductor of Example 1 is about 20% of that of the transparent conductor of Comparative Experiment A when both were formed on polycarbonate substrates.

Transparent conductors were also formed on polyester substrates. The transparent conductors of Example 1 and Comparative Experiment A on polyester substrates were subjected to a temperature of 85° C. and a relative humidity of 85% for 500 hours which simulates long-term aging. The resistivities drop and show an even larger difference than for the as-prepared transparent conductors.

All results are shown in Table 1.

TABLE 1

|  | Example 1 | Comparative Experiment A |
| --- | --- | --- |
| Resistivity On Polyester | 1700 ohm/sq/mil | 2100 ohm/sq/mil |
| Resistivity After 500 hrs @ 85° C./85% RH | 850 ohm/sq/mil | 1500 ohm/sq/mil |
| Resistivity On Polycarbonate | 1900 ohm/sq/mil | 9200 ohm/sq/mil |

What is claimed is:

1. A polymer thick film transparent conductor composition comprising:
   (a) 10-70 wt % of a conductive oxide powder selected from the group consisting of indium tin oxide powder, antimony tin oxide powder and mixtures thereof; and
   (b) 30-90 wt % of an organic medium comprising 1-50 wt % thermoplastic urethane resin and 10-50 wt % thermoplastic polyhydroxyether resin, wherein the thermoplastic urethane resin and the thermoplastic polyhydroxyether resin are both dissolved in triethyl phosphate and wherein the weight percent of the thermoplastic urethane resin and the thermoplastic polyhydroxyether resin are based on the total weight of the organic medium;
   wherein the weight percent of the conductive oxide powder and the organic medium are based on the total weight of the polymer thick film transparent conductor composition.

2. The polymer thick film transparent conductor composition of claim 1, wherein said conductive oxide powder consists of particles in the form of flakes.

3. The polymer thick film transparent conductor composition of claim 1, wherein said thermoplastic urethane resin is a urethane homopolymer or a polyester-based copolymer and said thermoplastic urethane resin is a polyester-based copolymer.

4. A capacitive switch circuit comprising a substrate and a transparent conductor formed from a polymer thick film transparent conductor composition comprising:
   (a) 10-70 wt % of a conductive oxide powder selected from the group consisting of indium tin oxide powder, antimony tin oxide powder and mixtures thereof; and
   (b) 30-90 wt % of an organic medium comprising 1-50 wt % thermoplastic urethane resin and 10-50 wt % thermoplastic polyhydroxyether resin, wherein the thermoplastic urethane resin and the thermoplastic polyhydroxyether resin are both dissolved in triethyl phosphate and wherein the weight percent of the thermoplastic urethane resin and the thermoplastic polyhydroxyether resin are based on the total weight of the organic medium;
   wherein the weight percent of the conductive oxide powder and the organic medium are based on the total weight of the polymer thick film transparent conductor composition.

5. The capacitive switch circuit of claim 4, wherein said conductive oxide powder consists of particles in the form of flakes.

6. The capacitive switch circuit of claim 4, wherein said thermoplastic urethane resin is a urethane homopolymer or a polyester-based copolymer and said thermoplastic urethane resin is a polyester-based copolymer.

7. The capacitive switch circuit of claim 4, further comprising a thermoformable silver conductor, wherein said transparent conductor has been formed on said thermoformable silver conductor.

8. The capacitive switch circuit of claim 4, further comprising a thermoformable silver conductor, wherein, following the drying of said polymer thick film conductive composition to form said transparent conductor, said thermoformable silver conductor is formed on top of the transparent conductor before said capacitive switch circuit is thermoformed.

9. The capacitive switch circuit of claim 4, wherein said capacitive switch circuit is subsequently subjected to an injection molding process.

10. The capacitive switch circuit of claim 4, wherein said substrate is a polycarbonate substrate.

11. A capacitive switch circuit comprising a substrate, a dried encapsulant layer and a transparent conductor formed from a dried polymer thick film transparent conductor composition, said polymer thick film transparent conductor composition comprising:
   (a) 10-70 wt % of a conductive oxide powder selected from the group consisting of indium tin oxide powder, antimony tin oxide powder and mixtures thereof; and
   (b) 30-90 wt % of an organic medium comprising 1-50 wt % thermoplastic urethane resin and 10-50 wt % thermoplastic polyhydroxyether resin, wherein the thermoplastic urethane resin and the thermoplastic polyhydroxyether resin are both dissolved in triethyl phosphate and wherein the weight percent of the thermoplastic urethane resin and the thermoplastic polyhydroxyether resin are based on the total weight of the organic medium;
   wherein the weight percent of the conductive oxide powder and the organic medium are based on the total weight of the polymer thick film transparent conductor composition.

12. The capacitive switch circuit of claim 11, wherein said conductive oxide powder consists of particles in the form of flakes.

13. The capacitive switch circuit of claim 11, wherein said thermoplastic urethane resin is a urethane homopolymer or a polyester-based copolymer and said thermoplastic urethane resin is a polyester-based copolymer.

14. The capacitive switch circuit of claim 11, wherein said substrate is a polycarbonate substrate.

15. The capacitive switch circuit of claim 11, wherein said capacitive switch circuit is thermoformed.

16. The capacitive switch circuit of claim 15, wherein said capacitive switch circuit is subsequently subjected to an injection molding process.

17. The capacitive switch circuit of claim 11, further comprising a thermoformable silver conductor, wherein said transparent conductor has been formed on said thermoformable silver conductor and said encapsulant layer is deposited on said transparent conductor and dried.

18. The capacitive switch circuit of claim 17, wherein said capacitive switch circuit is thermoformed.

19. The capacitive switch circuit of claim 11, further comprising a thermoformable silver conductor, wherein, following the drying of said polymer thick film conductive composition to form said transparent conductor, said thermoformable silver conductor is formed on top of the transparent conductor before said encapsulant layer is deposited on said thermoformable silver conductor and dried.

20. The capacitive switch circuit of claim 19, wherein said capacitive switch circuit is thermoformed.

21. An electrical circuit comprising a substrate, a dried encapsulant layer and a transparent conductor formed from a dried polymer thick film conductive composition, said polymer thick film conductive composition comprising:
(a) 10-70 wt % 10-70 wt % of a conductive oxide powder selected from the group consisting of indium tin oxide powder, antimony tin oxide powder and mixtures thereof;
(b) 10-50 wt % first organic medium comprising 10-50 wt % thermoplastic urethane resin dissolved in a first organic solvent, wherein the weight percent of the thermoplastic urethane resin is based on the total weight of the first organic medium; and
(c) 10-50 wt % second organic medium comprising 10-50 wt % thermoplastic polyhydroxyether resin dissolved in an organic solvent wherein the weight percent of the thermoplastic polyhydroxyether resin is based on the total weight of the second organic medium;

wherein the weight percent of said conductive oxide powder, said first organic medium and said second organic medium are based on the total weight of said polymer thick film transparent conductor composition, wherein said polymer thick film transparent conductor composition is dried to form said transparent conductor before said encapsulant layer, comprising the same resins in the same ratios or in different ratios as present in said polymer thick film transparent conductor composition, is deposited and dried, and wherein said electrical circuit is thermoformed.

22. The electrical circuit of claim 21, wherein said conductive oxide powder consists of particles in the form of flakes.

23. The electrical circuit of claim 21, wherein said thermoplastic urethane resin is a urethane homopolymer or a polyester-based copolymer and said thermoplastic urethane resin is a polyester-based copolymer.

24. The electrical circuit of claim 21, further comprising a thermoformable silver conductor, wherein said transparent conductor has been formed on said thermoformable silver conductor and said encapsulant layer is deposited on said transparent conductor and dried.

25. The electrical circuit of claim 21, further comprising a thermoformable silver conductor, wherein, following the drying of said polymer thick film conductive composition to form said transparent conductor, said thermoformable silver conductor is formed on top of the transparent conductor before said encapsulant layer is deposited on said thermoformable silver conductor and dried.

26. The electrical circuit of claim 21, wherein said electrical circuit is subsequently subjected to an injection molding process.

27. The electrical circuit of claim 21, wherein said substrate is a polycarbonate substrate.

* * * * *